United States Patent
Winkler

(10) Patent No.: US 9,926,786 B2
(45) Date of Patent: Mar. 27, 2018

(54) METHOD FOR JOINING AT LEAST TWO ROTOR ELEMENTS OF A TURBOMACHINE

(71) Applicant: MTU Aero Engines AG, Munich (DE)

(72) Inventor: Lutz Winkler, Wunstorf (DE)

(73) Assignee: MTU AERO ENGINES AG, Munich (DE)

( * ) Notice: Subject to any disclaimer, the term of this patent is extended or adjusted under 35 U.S.C. 154(b) by 173 days.

(21) Appl. No.: 15/092,763

(22) Filed: Apr. 7, 2016

(65) Prior Publication Data

US 2016/0298456 A1 Oct. 13, 2016

(30) Foreign Application Priority Data

Apr. 13, 2015 (EP) ..................................... 15163329

(51) Int. Cl.
*F01D 5/02* (2006.01)
*F01D 21/00* (2006.01)
(Continued)

(52) U.S. Cl.
CPC ............ *F01D 5/027* (2013.01); *F01D 21/003* (2013.01); *F04D 29/321* (2013.01); *F04D 29/644* (2013.01); *F16F 15/32* (2013.01); *G01M 1/36* (2013.01); *F05D 2230/60* (2013.01); *F05D 2260/15* (2013.01); *F05D 2260/81* (2013.01);
(Continued)

(58) Field of Classification Search
CPC ........ F01D 5/027; F01D 21/003; G01M 1/36; F16F 15/32; F04D 29/321; F04D 29/644; Y02T 50/671; F05D 2230/60; F05D 2270/804; F05D 2260/15; F05D 2260/81
See application file for complete search history.

(56) References Cited

U.S. PATENT DOCUMENTS

| 4,864,859 A | 9/1989 | Jensen |
| 2005/0065712 A1 | 3/2005 | Skilton |

(Continued)

FOREIGN PATENT DOCUMENTS

| FR | 2303277 A1 | 10/1976 |
| GB | 2319812 A | 6/1998 |

OTHER PUBLICATIONS

Klocke, F., Veselovac, D., Auerbach, T., Seidner, R., "Intelligent Assembly for Aero Engine Components" C. Xiong et al. (Eds.): ICIRA 2008, Part II, LNAI 5315, pp. 927-935, 2008 @ Springer-Verlag Berlin Heidelberg 2008.

(Continued)

*Primary Examiner* — Moshe Wilensky
(74) *Attorney, Agent, or Firm* — Barlow, Josephs & Holmes, Ltd.

(57) ABSTRACT

The invention relates to a method for joining at least two rotor elements of at least one rotor of a turbomachine. The detecting of a radial runout of at least one radially outer-lying cylindrical surface of the rotor elements at each of at least two points that are spaced axially apart from each other occurs by a measuring device. Depending on this, a relative mounting alignment of the rotor elements with respect to one another, at which the distance of the total center of mass of the rotor is minimized relative to its total axis of rotation, is determined. The invention detects of the radial runout of the radially outer-lying cylindrical surfaces of the rotor elements occurs optically by at least one optical sensor element of the measuring device. The invention further relates to a measuring apparatus and to a mounting apparatus.

14 Claims, 2 Drawing Sheets

Figure 1:
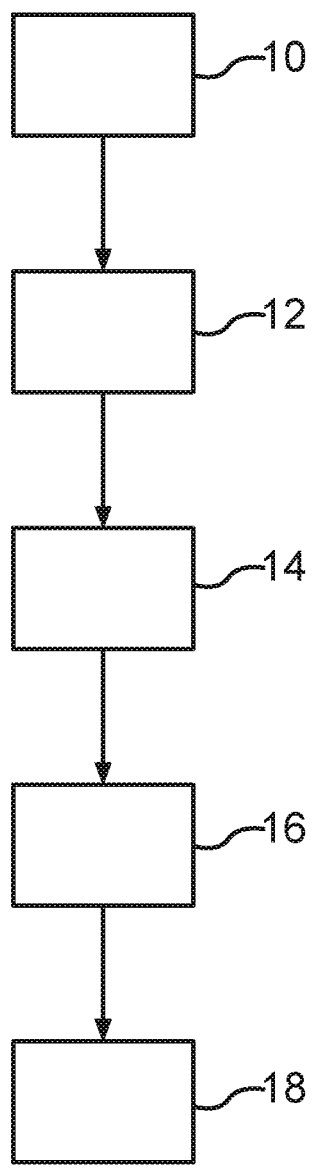

(51) Int. Cl.
*F04D 29/32* (2006.01)
*F04D 29/64* (2006.01)
*F16F 15/32* (2006.01)
*G01M 1/36* (2006.01)

(52) U.S. Cl.
CPC ....... *F05D 2270/804* (2013.01); *Y02T 50/671* (2013.01)

(56) References Cited

U.S. PATENT DOCUMENTS

2008/0075592 A1  3/2008  Lee et al.
2009/0234481 A1  9/2009  Lee et al.

OTHER PUBLICATIONS

Projekt, "AFFIX-Aligning, Holding and Fixing Flexible and Difficult to Handle Components," WZL—Werkzeugmaschinenlabor der RWTH AACHEN—Germany—http://www.wzl.rwth-aachen.de/de/90d5da0fca487ceac125749900520e16.htm (Accessed Feb. 12, 2014).

Aligning, Holding and Fixing Flexible and Difficult to Handle Components (AFFIX),—http://www.2020-horizon.com/AFFIX-Aligning-Holding-and-Fixing-Flexible-and-Difficult-to-Handle (Accessed Feb. 12, 2014).

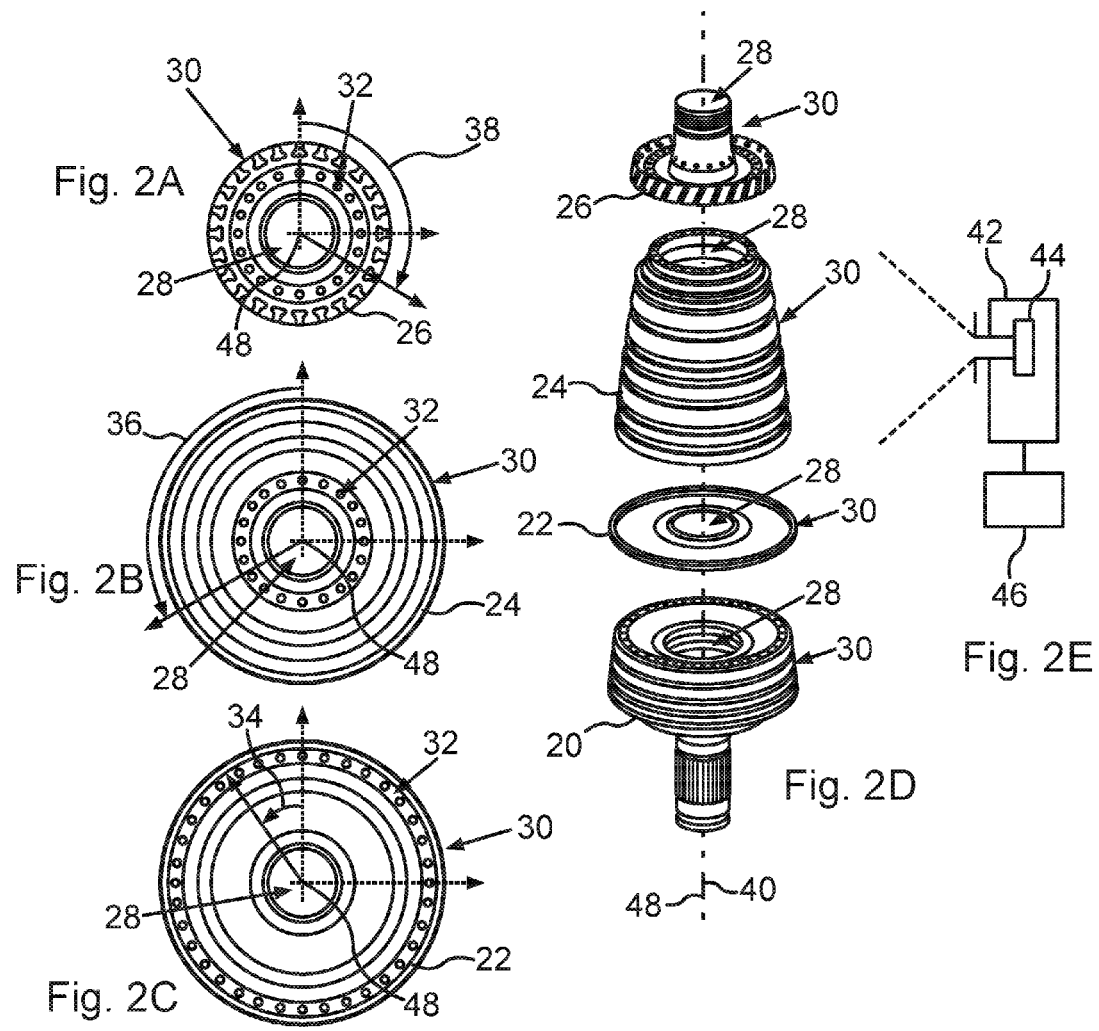

METHOD FOR JOINING AT LEAST TWO ROTOR ELEMENTS OF A TURBOMACHINE

BACKGROUND OF THE INVENTION

The invention relates to a method for joining at least two rotor elements of at least one rotor of a turbomachine in accordance with the present invention. The invention further relates to a measuring apparatus and a mounting apparatus.

A rotor of a turbomachine is composed of individual rotor elements, such as disks, drums, and/or shafts. A goal herein is to minimize during mounting any out-of-balance of the rotor to be manufactured and hence to improve its performance. This is usually accomplished by the principle of trial and error. After two rotor elements have been joined, the outcome is inspected and matched to manufacturing specifications. In the event of an adequately good outcome, the next step of mounting can occur. In the event of a poor outcome, the two rotor elements have to be taken apart again and joined to each other once again in another relative mounting alignment. Afterward, it is necessary to inspect once again whether the out-of-balance of the rotor that results therefrom meets the specifications. These steps have to be repeated until the entire rotor has been assembled and the specifications placed on the out-of-balance thereof have been met. It is therefore not possible to plan a rotor assembly and the outcome may require improvement.

For this reason, there are providers of so-called rotor optimization methods. Known in this case are, for example, methods of the companies Axiam and Precitech. In these methods, a radial runout of at least one radially outer-lying cylindrical surface of the rotor elements is detected at each of at least two points that are spaced axially apart from each other by using special tactile sensor elements. Depending on these measurement data, it is then determined how the individual rotor elements should be aligned relative to one another during mounting in order to minimize the out-of-balance of the rotor to be manufactured.

However, a drawback of this known rotor optimization method is that it is not sufficiently precise for turbomachines for which particularly high demands are placed on the out-of-balance of the rotor. Especially in the case of particularly large turbomachines and correspondingly particularly large rotor elements, the known methods are not sufficiently precise to reduce the out-of-balance to an acceptable magnitude.

SUMMARY OF THE INVENTION

For this reason, the object of the present invention is to make available a method in which any out-of-balance of a rotor to be manufactured can be minimized especially well.

This object is achieved in accordance with a method of the present invention for joining at least two rotor elements. In addition, this object is achieved by a measuring apparatus and a mounting apparatus of the present invention. Advantageous embodiments with appropriate enhancements of the invention are presented in the respective dependent claims, in which advantageous embodiments of the apparatuses are to be regarded as advantageous embodiments of the method, and vice versa.

A first aspect of the invention relates to a method for joining at least two rotor elements of at least one rotor of a turbomachine, the method includes at least the following steps:

detecting any radial runout of at least one radially outer-lying cylindrical surface of the rotor elements at each of at least two points that are spaced axially apart from each other by a measuring device;

determining a distance and an angular position of a center of mass with respect to an axis of rotation of the respective rotor element as a function of the respectively detected radial runout;

determining a respective distance of a total center of mass of the rotor assembled from the rotor elements with respect to its total axis of rotation for various relative mounting alignments of the rotor elements with respect to one another as a function of the previously determined centers of mass of the respective rotor elements by an analysis device;

determining those alignments of these various relative mounting alignments of the rotor elements with respect to one another for which the distance of the total center of mass of the rotor is minimized relative to its total axis of rotation;

joining the rotor elements to one another by that mounting alignment for which the previously determined distance of the total center of mass of the rotor to be manufactured is minimized relative to its total axis of rotation.

The method according to the invention provides for detecting or capture of the radial runout of the radially outer-lying cylindrical surfaces of the rotor elements occurs optically by at least one optical sensor element of the measuring device. An optical sensor element can capture the respective radial runout of the respective rotor elements substantially more precisely than can a tactile sensor element. Moreover, an optical sensor element can perform a measurement at at least two points that are spaced axially apart from each other, without it being compulsory for the sensor element to be moved and/or adjusted in place to accomplish this. As a result, it is possible to prevent inaccuracies in a measurement due to such an adjustment and/or movement of the sensor element. This is of advantage especially in the case of particularly large rotors and/or rotor elements. In the case of a particularly large rotor element, it is possible to use the optical sensor element to capture without any problem, for example, the radial runout of the uppermost end and of the bottommost end of the radially outer-lying cylindrical surface of the rotor element, without it being necessary to adjust in place the optical sensor element. In this case, it is advantageously possible for the radial runout of the least two points that are spaced axially apart from each other to be captured simultaneously by the optical sensor element.

The optical sensor element can be a 3D camera, for example. In order to capture the radial runout of the radially outer-lying cylindrical surface of a rotor element, the rotor element can be mounted, for example, rotatably on a measuring table. Alternatively, the optical sensor element for capturing the radial runout can be moved around the rotor element and, in particular, revolved around it. Another possibility is to provide at least enough optical sensor elements that the radial runout of the cylindrical surface at a revolving measurement site can be completely captured. This means that the cylindrical surface can be captured by a plurality of optical sensor elements revolving completely simultaneously at at least one axial point. As a result, inaccuracies in the capturing of the radial runout that can arise due to a movement of the rotor element and/or the optical sensor element can be prevented.

Owing to the possibility of being able to capture the radial runout of the rotor elements in an especially precise manner by the optical sensor element, it is also possible to determine particularly precisely the distance and the angular position of the center of mass of the rotor elements. As a result, it is also possible to determine particularly precisely and reliably the relative mounting alignments of the rotor elements with respect to each other for which the distance of the total center of mass of the rotor with respect to its total axis of rotation is particularly small. Correspondingly, it is possible to reduce particularly reliably the out-of-balance of the rotor to be manufactured.

A position of the respective center of mass of the respective rotor elements can be determined, for example, by determining the main axes of inertia of the rotor element on the basis of the detected radial runout. The determination of the respective distance of the total center of mass of the rotor assembled from the rotor elements with respect to the total axis of rotation can occur in a similar fashion. These determinations can be carried out by an analysis device, which comprises at least one computer, for example.

The relative mounting alignments of the rotor elements with respect to each other correspond, in particular, to the relative alignment of the angular positions of the centers of masses of the rotor elements in a defined alignment with respect to each other. The rotor elements are twisted relative to each other around a common axis of rotation to change a mounting alignment of the rotor elements with respect to one another. The common axis of rotation of the rotor elements is defined, for example, by an axis of a common shaft.

Prior to the capture of the radial runout of the rotor elements, their respective position relative to the measuring device can be marked. The mounting alignment for which the rotor elements are to be joined to one another can then be given, for example, as a relative angle of rotation of this marking of a rotor element with respect to a marking of another rotor element. Thus, an alignment of rotor elements with respect to one another is then possible in such a way that it corresponds to the optimized mounting alignment.

In another advantageous embodiment of the method according to the invention, it is provided that, by the optical sensor element, any eccentricity of an entire respective cylindrical surface of the rotor elements is detected, whereby the distance and the angular position of the center of mass from the axis of rotation of the respective rotor element are determined by the analysis device as a function of this captured eccentricity of the entire respective cylindrical surface. Through the use of an optical sensor element, it is possible to detect the radial runout of the radially outer-lying cylindrical surfaces of the respective rotor elements at nearly any arbitrary number of points that are spaced axially apart from one another. The distance and the number of these points are limited solely by the resolution of the optical sensor element. Hence, it is possible to record the entire eccentricity curve of the cylindrical surface of the rotor elements. In contrast to tactile measuring devices, therefore, substantially fewer interpolations between measurement points are necessary when the eccentricity of the entire cylindrical surface is to be taken into account. As a result, the distance and the angular position of the center of mass from the axis of rotation of the respective rotor elements can be determined particularly precisely.

It is possible in theory also to detect the eccentricity of the entire cylindrical surface by a tactile sensor element. However, such detection by a tactile sensor element is significantly more complex and less precise than that by an optical sensor element. In particular, a repeated and/or a particularly small movement of a tactile sensor element can also result in further inaccuracies in the measurement of the radial runout. By contrast, the optical sensor element can capture simultaneously the entire cylindrical surface at nearly any arbitrary number of points that are spaced axially apart from one another, whereas a tactile sensor element has to be moved to each point at which the radial runout is to be measured. This means that a corresponding measurement can also be carried out substantially faster when the optical sensor element is used.

In another advantageous embodiment of the method according to the invention, it is provided that, by the measuring device, a radial runout of at least two mounting points of the respective rotor elements that are spaced axially apart from each other is captured, whereby the axis of rotation of the respective rotor elements is thereby determined by the analysis device, as a function of these captured radial runouts of mounting sites that are spaced axially apart from each other. In other words, not only the radial runout of the respective rotor elements is detected, but also the relative position of the axis of rotation of the respective rotor elements relative to the radial runout thereof and/or relative to the cylindrical surface thereof. The mounting sites of the rotor elements may also be subject to certain manufacturing tolerances during the manufacture thereof. These deviations can now also be taken into account in minimizing the out-of-balance of the rotor to be manufactured.

The mounting sites in this case can be detected both with an optical sensor element and with a haptic sensor element. When an optical sensor element is used, the advantages thereof are once again of import with respect to the accuracy and speed of the method. Moreover, the same sensor element as that used for detecting the radial runout of rotor elements can be used. Here, however, it may be necessary in some cases to move the optical sensor element and, in particular, to twist it. This is not necessary when an additional optical or haptic sensor element is used. In addition, the respective mounting sites can be measured simultaneously with the radial runout of the rotor element. In particular, if appropriate, no calibration of the measuring device is then necessary, because a reference point ensues from the measurement of the axis of rotation.

In another advantageous embodiment of the method according to the invention, it is provided that, by at least one optical sensor element, any eccentricity of an entire bearing cylindrical surface of the respective rotor elements is detected, wherein the axis of rotation of the respective rotor elements is determined by the analysis device, as a function of this detected eccentricity of the entire bearing cylindrical surface. In this case, the advantages are similar to those for detecting the eccentricity of the entire radially outer-lying cylindrical surface of the rotor elements. The axis of rotation can be determined particularly precisely in this way and/or inaccuracies due to interpolations are especially reduced.

Alternatively or additionally, it is also possible by the measuring device to detect the planarity of at least one front end of at least one of the rotor elements at two points of the front end that are spaced radially apart from each other. Deviations in the planarity of the front ends of the rotor elements can also have an influence on the position of the center of mass of a rotor element. Correspondingly, when the planarity of the front end of the rotor elements is taken into account, it is possible to reduce especially reliably the out-of-balance of the rotor to be manufactured. In the process, the planarity of the entire front end also can be advantageously detected by an optical sensor element and, as a function thereof, the angular position and the distance of the center of mass of the respective rotor elements can be determined.

In another advantageous embodiment of the method according to the invention, it is provided that correction factors are specified for the respective rotor elements, wherein, as a function of these correction factors, the respective distance of the total center of mass of the rotor assembled from the rotor elements with respect to its total axis of rotation is determined for various relative mounting alignments of the rotor elements with respect to one another by the analysis device. The correction factors are manual specifications so as to be able to observe further constraints imposed on the joining of the at least two rotor elements to each other. For example, it is possible in this way to take into account further attached parts on the rotor element, which are not measured. For example, it is possible by a correction factor also to optimize the rotor assembly in such a way that one of the bearings of the rotor is subjected to particularly little load due to any out-of-balance. As a result of the correction factor, it is possible to determine optimally a mounting alignment of the rotor elements with respect to one another for which the distance of the center of mass of the rotor to be manufactured does not attain the smallest possible value.

In another advantageous embodiment of the method according to the invention, it is provided that, for the respective rotor elements, one of the respective correction factors is specified in such a way that this correction factor corresponds respectively to a mass or weight of the respective rotor element. As a result, it is possible to take into account in an especially simple way the fact that different rotor elements have different weights. A center of mass of a heavy rotor element has a greater influence on the position of the total center of mass of the rotor to be manufactured and hence on the out-of-balance of the rotor than does a lighter rotor element. This influence can be taken into account in an especially simple way by the correction factors.

In another advantageous embodiment of the method according to the invention, it is provided that the data recorded by the measuring device are linked by the analysis device to a three-dimensional model, in particular a CAD model, of the respective rotor elements. In this case, the three-dimensional model can itself also be generated from the detected data. As a result, a graphical output of the measurement results is possible. In particular, the actual form, that is, the respectively recorded surfaces of the rotor element, can be compared with the optimal form thereof. Moreover, in the three-dimensional model, it is possible to take into account recesses, depressions, and/or cavities that cannot be recorded by the measuring device. By the three-dimensional model of the rotor elements, it is possible also to join them to one another virtually in a CAD program in order to be able to determine an optimal relative mounting alignment of the rotor elements with respect to one another by using, for example, a design tool that is already used during the design of the rotor. In addition, by linkage to a three-dimensional model, it is possible to determine in an especially simple way the actual total weight of the rotor elements, in particular taking into account the actual form of the rotor elements.

In another advantageous embodiment of the method according to the invention, it is provided that the three-dimensional model of the respective rotor elements includes information on the respective densities thereof, in particular a density distribution, wherein, as a function of this information, the relative mounting alignments of the respective rotor elements with respect to one another for which the distance of the total center of mass of the rotor to be manufactured relative to its total axis of rotation is thereby minimized. As a result, it is possible to take into account that a rotor element can be composed of several different materials. In the case of different local densities, any radial runout errors that respectively exist there have different effects on the total center of mass of the rotor to be manufactured. This can readily be taken into account using information on the density, and hence the out-of-balance of the rotor to be manufactured can be especially reduced. Depending on this information, the distance and the angular position of the center of mass of the respective rotor elements from the axis of rotation thereof can be determined. The determination of the total weight of respective rotor elements and of the rotor to be manufactured is also possible in this way in an especially simple manner.

In another advantageous embodiment of the method according to the invention, it is provided that, depending on the data detected by the measuring device, at least one of the respective rotor elements is post-processed. Only when any existing deviations of the rotor element from an ideal radial runout have been detected, if applicable, is an appropriate post-processing possible. A post-processing of the rotor elements can occur, in particular, by grinding or by machining. As a result, a distance of a center of mass of the rotor element to be post-processed from its axis of rotation and/or the angular position thereof can be reduced and/or altered. Correspondingly, it is also possible by the post-processing to influence the out-of-balance of the rotor to be manufactured. A post-processing is especially simple when the data detected by the measuring device have been linked to the three-dimensional model. A post-processing of individual rotor elements is particularly appropriate if otherwise, without any post-processing, a distance of the total center of mass of the rotor to be manufactured would still exceed a tolerance specification for the determined optimal relative mounting alignment of the rotor elements with respect to one another.

In another advantageous embodiment of the method according to the invention, it is provided that, by way of the measuring device, the data of a large number of functionally similar rotor elements are detected and, by the analysis device, the rotor element of this large number of functionally similar rotor elements chosen for joining to at least one further rotor element is that rotor element whose choice minimizes the distance of the total center of mass of the rotor to be manufactured from its total axis of rotation. Through an adept combination of the rotor elements, it is then possible to use for the assembly of a rotor, if appropriate, also rotor elements that would otherwise be evaluated as rejects. The data involve measurement values detected by the measuring device, with it also being possible to take into account at the same time the three-dimensional model. These data and/or the three-dimensional model can be deposited in a database, for example. In this case, it may be especially appropriate not just to measure the rotor elements just directly prior to the planned joining, but rather already directly after the manufacture thereof in each case.

In another advantageous embodiment of the method according to the invention, it is provided that the various relative mounting alignments of the rotor elements with respect to one another for which the respective distances of the total center of mass of the rotor assembled from the rotor elements with respect to its total axis of rotation are determined are chosen for discrete torsional angles of the rotor elements with respect to one another. Usually, the alignment of the rotor elements with respect to one another is possible only in discrete steps for a mounting or for the joining thereof to one another. For example, respective drilled holes of the rotor elements, at which the rotor elements are screwed together, need to be aligned coaxially with respect to one another. In the case of 24 such drilled holes, for example, the relative mounting alignment of the respective rotor elements with respect to one another can be altered only in 15° steps. Accordingly, it is appropriate when the total center of mass of the rotor to be manufactured is also determined only for such alignments that can be mounted. As a result of taking into account this ability to mount the rotor elements with one another, the effort involved in implementing the method is therefore especially small.

In another advantageous embodiment of the method according to the invention, it is provided that the distance of the center of mass of the respective rotor elements relative to the respective axis of rotation thereof and/or the distance of the total center of mass of the rotor with respect to a total axis of rotation of the rotor to be manufactured are compared by the analysis device with a pre-specifiable threshold value that corresponds to a respective tolerance specification for the respective rotor element and/or for the rotor to be manufactured. If the distance of the center of mass of one of the rotor elements exceeds a tolerance specification, this rotor element can be provided for a post-processing, for example. Moreover, the tolerance specification can be observed in each case when the distance of the total center of mass of the rotor to be manufactured from its axis of rotation is determined for the various relative mounting alignments of the rotor elements with respect to one another. If, initially for one of the various relative mounting alignments of the rotor elements, this determination reveals that a tolerance specification is met, then it is possible to dispense with further determinations. Instead of this, the rotor elements can be joined to one another directly for this relative mounting alignment. Various relative mounting alignments of the rotor elements with respect to one another can thus be inspected until the rotor resulting from a joining of the rotor elements meets a tolerance specification for its current mounting alignment in each case. It is then possible to dispense with further inspections. The tolerance specification can thus be used as a kind of termination criterion for a step of the method. In this way, the method is carried out in an especially effortless manner and can be performed especially fast.

In another advantageous embodiment of the method according to the invention, it is provided that the method is a method for joining at least two rotor elements of at least one rotor of a turbomachine designed as an aircraft engine. Especially in the case of aircraft engines, particularly high requirements are placed on the out-of-balance, so that the application of the method is especially appropriate. Too high an out-of-balance in an aircraft engine can otherwise lead to vibrations, which place an unnecessary load on the structure of an aircraft.

A second aspect of the invention relates to a measuring apparatus for use in a method for joining at least two rotor elements of at least one rotor of a turbomachine, such as has already been described above. In accordance with the invention, it is provided that a measuring device of the measuring apparatus comprises at least one optical sensor element, by which any radial runout of radially outer-lying cylindrical surfaces of the respective rotor elements can be captured. The features and advantages ensuing from the use of the method according to the first aspect of the invention may be taken from the descriptions of the first aspect of the invention, with advantageous embodiments of the first aspect of the invention to be regarded as advantageous embodiments of the second aspect of the invention, and vice versa.

A third aspect of the invention relates to a mounting apparatus having such a measuring device, which, in addition, comprises at least one alignment device. By this alignment device, the rotor elements can be aligned automatically with respect to one another in such a way that, when the rotor elements are joined together, the distance of the total center of mass of the rotor to be manufactured is minimized with respect to its total axis of rotation. In this way, it can be directly ensured that the rotor elements are also joined to one another precisely for the determined, optimal relative mounting alignment. The use of such a mounting apparatus is of advantage, in particular, in a mass production and/or assembly line production of turbomachines. The features and advantages ensuing from the use of the method according to the first aspect of the invention and/or ensuing from the use of the measuring apparatus according to the second aspect of the invention may be taken from the descriptions of the first and/or second aspect(s) of the invention, with advantageous embodiments of the first and/or second aspect(s) of the invention to be regarded as advantageous embodiments of the third aspect of the invention, and vice versa.

BRIEF DESCRIPTION OF THE DRAWING FIGURES

Further features of the invention ensue from the claims and the exemplary embodiments as well as on the basis of the drawings. The features and combinations of features mentioned in the description as well as the features and combinations of features mentioned below in the exemplary embodiments can be used not only in the respectively given combinations, but also in other combinations, without departing from the scope of the invention.

Shown are:

FIG. 1 a schematic flow chart of the method according to the invention; and

FIGS. 2A-2E show schematic perspective and schematic plan views how a plurality of rotor elements are joined to one another.

DESCRIPTION OF THE INVENTION

FIG. 1 shows, in a schematic flow chart, how the method can be carried out for the joining of at least two rotor elements of at least one rotor of a turbomachine. The rotor elements 20, 22, 24, 26 that are to be joined by way of example are illustrated in a schematic perspective view and in a schematic plan view in FIGS. 2A-2E. In accordance with a first method step 10, a radial runout of at least one radially outer-lying cylindrical surface 30 of the rotor elements 20, 22, 24, 26 is detected at each of at least two points that are spaced axially apart from each other by a measuring device 42 (see also FIG. 2). Afterward, in a method step 12, a distance and an angular position of a center of mass with respect to an axis of rotation 48 of the respective rotor element 20, 22, 24, 26 is determined as a function of the respectively detected radial runout. In a further method step 14, a respective distance of a total center of mass of the rotor assembled from the rotor elements 20, 22, 24, 26 with respect to its total axis of rotation 40 is determined or specified by an analysis device 46 for various relative mounting alignments of the rotor elements 20, 22, 24, 26 with respect to one another as a function of the previously determined centers of mass of the respective rotor elements 20, 22, 24, 26. This is followed, in a further method step 16, by a determination of the alignments of these various relative mounting alignments of the rotor elements 20, 22, 24, 26 with respect to one another for which the distance of the total center of mass of the rotor relative to its total axis of rotation 40 is minimized. Finally, in a following method step 18, the rotor elements 20, 22, 24, 26 are joined to one another by those mounting alignments for which the previously determined distance of the total center of mass of the rotor to be manufactured relative to its total axis of rotation 40 is minimized.

The detecting of the radial runout of the radially outer-lying cylindrical surfaces 30 of the rotor elements 20, 22, 24, 26 occurs optically in this case by at least one optical sensor element 44 of the measuring device 42. In this way, the radial runout of the radially outer-lying cylindrical surfaces 30 of the rotor elements 20, 22, 24, 26 can be captured especially precisely, and hence the out-of-balance of the rotor to be manufactured can be minimized in an especially reliable way.

The analysis device 46 is designed as a computer, for example. The measuring device 42 transmits the detected data of the rotor elements 20, 22, 24, 26 to the analysis device 46, in which these data can be saved. In particular, respective measurement results can be deposited in this case in a database of the analysis device 46.

The method described above will be described below once again on the basis of the concrete example shown in FIGS. 2A-2E Shown in FIGS. 2A-2E, in a schematic perspective view and a schematic plan view, are a plurality of rotor elements 20, 22, 24, 26. The goal of the method according to FIG. 1 is, after a scan of the rotor elements 20, 22, 24, 26, to twist these virtually with respect to one another in such a way that an optimal relative position of these rotor elements 20, 22, 24, 26 with respect to one another can be found. With this position of the rotor elements 20, 22, 24, 26, they are then joined to one another. Such a joining can occur, for example, by pushing the rotor elements 20, 22, 24, 26 onto a common shaft and screwing them to one another there. The optimal position in this case is the relative mounting alignment of the rotor elements 20, 22, 24, 26 with respect to one another for which any out-of-balance of the rotor to be manufactured is minimized. In addition, it is the position for which the bearing sites 28 of the rotor elements 20, 22, 24, 26 and the centers of mass of additionally scanned hubs are best aligned and thus exhibit the least eccentricity.

The components are scanned in as follows: the optical sensor element 44 of the measuring device 42, designed as a 3D camera, captures the radially outer-lying cylindrical surfaces 30 of the rotor elements 20, 22, 24, 26. As a result, a distance of the center of mass of the respective rotor element 20, 22, 24, 26 from the respective axis of rotation 48 thereof—which, in this case, corresponds to the respectively drawn coordinate system of the rotor elements 20, 22, 24, 26 and also to the total axis of rotation 40 of the rotor to be manufactured—can be computed. This computation can occur by a computer, for example. The axes of rotation 48 and the total axis of rotation 40 correspond in each case to the axial direction of the rotor elements 20, 22, 24, 26 and of the rotor to be manufactured.

In addition, it is possible by the 3D camera to capture radially inner-lying cylindrical surfaces of the rotor elements 20, 22, 24, 26 that form the bearing sites 28. By these bearing sites 28, the rotor elements 20, 22, 24, 26 are mounted on a common shaft. In addition, it is possible by detecting the radial runout thereof and/or the eccentricity thereof also to determine the actual axes of rotation 48 of the rotor elements 20, 22, 24, 26. In this way, the influence of the rotor elements 20, 22, 24, 26 on the out-of-balance of the rotor to be manufactured can be determined especially precisely. In addition, it is thereby possible to dispense with a calibration of the measuring device 42 on the respective axes of rotation 48 of the rotor elements 20, 22, 24, 26.

For the determination of the optimal mounting alignment of the rotor elements 20, 22, 24, 26 with respect to one another, a possible position number can be chosen. In the example shown in FIGS. 2A-2E, this position number is 24, for example. It corresponds to the number of drilled holes 32, by which the rotor elements 20, 22, 24, 26 are screwed to one another. In order to be able to join the rotor elements 20, 22, 24, 26 to one another, the drilled holes 32 thereof must be aligned coaxially with respect to one another. Adjusted by the position number in this case is the step in which the rotor elements 20, 22, 24, 26 are twisted with respect to one another for determination of the optimal relative mounting alignment. In this example, the rotor elements 20, 22, 24, 26 can therefore be joined relative to one another only in discrete angular positions of 15° in each case. In each of these steps, it is determined how the center of mass of the rotor to be manufactured is altered by twisting of the rotor elements 20, 22, 24, 26 relative to one another.

In addition, correction factors are stipulated, by which it is determined which points are weighted for an evaluation and selection of a construction prognosis of the rotor to be manufactured. In the example shown, only the bearing sites 28 and the cylindrical surfaces 30 are taken into account. In this case, respective correction factors for the rotor elements 20, 22, 24, 26 are chosen in such a way that they correspond to the respective weights of the rotor elements 20, 22, 24, 26. For example, the rotor element 26 is formed from a titanium alloy and usually has a substantially lower density and lower weight than the rotor element 20 formed from a steel alloy.

In addition, by the correction factors, it is also possible to take into account the fact that the rotor elements 20, 22, 24, 26 can have a different degree of influence on the total center of mass of the rotor to be manufactured, given identical distances of their respective centers of mass. Furthermore, for example, parts that are not to be taken into account and/or are not to be measured can be left out of consideration by a weighting of 0 for the determination of the optimal relative mounting alignment of the rotor elements 20, 22, 24, 26 with respect to one another. For example, respective flanges of the rotor can be left out of consideration.

In addition, it is possible to provide for a smoothing of the data of the rotor elements 20, 22, 24, 26, the data being scanned in and/or digitally detected by the measuring device 42, this being accomplished, for example, by a simple and/or quadratic mean value computation. In this way, it is possible to compensate for inaccuracies of the detected data and/or to generate interpolations between various sites at which the radial runout of the rotor elements 20, 22, 24, 26 has been detected.

In addition, it is possible by the detected data to output a three-dimensional model of the rotor elements 20, 22, 24, 26 and of the rotor to be manufactured. To this end, it is possible to provide a visualization factor in order to be able to also illustrate small dimensions for the deviation of the radial runout of the rotor elements 20, 22, 24, 26 from an idealized radial runout in the range of hundredths of millimeters, in a visible graphical manner. For example, these deviations are scaled up with a visualization factor of 2000 for a graphical illustration. The graphical illustration can be output on a display screen of the analysis device 46, for example.

Once the optimal relative mounting alignment of the rotor elements 20, 22, 24, 26 with respect to one another has been determined, it is possible to use it to establish respective mounting positions, that is, angular positions, of the rotor elements 20, 22, 24, 26 with respect to one another for which the eccentricity of the established hub centers of mass is at a minimum.

For example, if the rotor element 20 is used as a reference rotor element, the mounting alignment thereof is not altered. By contrast, the rotor element 22 has to be twisted by an angle of 30° counterclockwise to the left relative to its initial position with respect to the rotor element 20. This angle is illustrated in FIGS. 2A-2E by an arrow having the reference number 34, namely FIG. 2C. By contrast, the rotor element 24 is twisted by 120° counterclockwise to the left, this being marked by an arrow having the reference number 36 as in FIG. 2B. For the optimal relative mounting alignment, the rotor element 26 is twisted by an angle of 120° clockwise to the right. This angle is marked by an arrow having the reference number 38, as in FIG. 2A. The respective centers of mass of the rotor elements 20, 22, 24, 26 then deviate in their angular position and distance from the total axis of rotation 40 in such a way that these deviations are minimized in sum total. This means that the individual out-of-balances of the respective rotor elements 20, 22, 24, 26 compensate for one another at least partially. As a result, for this alignment of the rotor elements 20, 22, 24, 26, the distance of the total center of mass of the rotor to be manufactured is also minimized.

This twisting of the rotor elements 20, 22, 24, 26 can occur automatically by an alignment device, for example. Alternatively or additionally, a corresponding alarm can be output optically and/or acoustically as a clear assembly instruction for the rotor to be manufactured, for example, by the analysis device 46. If need be, the rotor elements 20, 22, 24, 26 can then be manually aligned with respect to one another. In a manual alignment, the original initial position of the rotor elements 20, 22, 24, 26, at which they were measured, should be marked.

In the optimized relative mounting alignment with respect to one another, the rotor elements 20, 22, 24, 26 are subsequently screwed together. The rotor of the turbomachine manufactured in this way has an especially low out-of-balance on account of the especially precise recording of the radial runouts of the rotor elements 20, 22, 24, 26.

In addition, it is possible to measure each of the rotor elements 20, 22, 24, 26 separately by the measuring device 42. Alternatively, however, a joint measurement of the rotor elements 20, 22, 24, 26 is also possible. For this, it is especially appropriate to mount the rotor elements 20, 22, 24, 26, in part already on a common shaft. This means that the rotor elements 20, 22, 24, 26 are, for example, already pushed onto the common shaft in their respectively intended axial position. In the process, however, the rotor elements 20, 22, 24, 26 are not yet fixed in terms of their angular position and hence can still be twisted with respect to one another. Once the rotor elements 20, 22, 24, 26 have been measured, the rotor elements 20, 22, 24, 26 can be twisted initially into their desired relative alignment with respect to one another in order only afterward to be joined together by screwing, for example. Afterward, an inspection of the rotor assembly can occur directly by a repeated measurement by the measuring device 42, without having to perform a calibration once again. Alternatively, the out-of-balance of the manufactured rotor can be inspected by way of an appropriate test bench, which rotates the rotor, for example, and measures the forces that thereby ensue.

Instead of a tactile measurement of the rotor elements 20, 22, 24, 26, the flanges thereof and some reference points are scanned by an optical 3D measuring technique. The associated rotor elements 20, 22, 24, 26 can be processed in a commercially available CAD program, for example, and hence joined virtually in this program. In this case, the CAD program can run on the analysis device 46. In the CAD program, the rotor elements 20, 22, 24, 26 can be virtually twisted, regardless of the true topography of their joining sites—in particular, of the flanges and respective tolerance diameters—until, for respective reference points, the radial runout errors that are possible for the rotor to be manufactured, depending on the actual form of the rotor elements 20, 22, 24, 26, are minimized to the greatest extent. The result is then a clear assembly instruction for a rotor with a minimized out-of-balance. In this way, it is possible to plan a rotor assembly with predictable outcome. The running smoothness of the turbomachine can be increased. In the case of aircraft engines, it is possible by the rotor being manufactured in this way especially to increase its performance and decrease its vibrations.

What is claimed is:

1. A method for joining at least two rotor elements of at least one rotor of a turbomachine, the method comprising at least the following steps:

detecting any radial runout of at least one radially outer-lying cylindrical surface of the rotor elements at each of at least two points that are spaced axially apart from each other by a measuring device;

determining a distance and an angular position of a center of mass with respect to an axis of rotation of the respective rotor element as a function of the respectively detected radial runout;

determining a respective distance of a total center of mass of the rotor assembled from the rotor elements with respect to its total axis of rotation for various relative mounting alignments of the rotor elements with respect to one another as a function of the previously determined centers of mass of the respective rotor elements by an analysis device;

determining of those alignments of these various relative mounting alignments of the rotor elements with respect to one another for which the distance of the total center of mass of the rotor is minimized relative to its total axis of rotation; and joining the rotor elements to one another by that mounting alignment for which the previously determined distance of the total center of mass of the rotor to be manufactured is minimized relative to its total axis of rotation, wherein the step of detecting any radial runout of the radially outer-lying cylindrical surface of the rotor elements occurs optically by at least one optical sensor element of the measuring device, and wherein, by the optical sensor element, an eccentricity of an entire respective cylindrical surface of the rotor elements is captured, and wherein, by the analysis device, the distance and the angular position of the center of mass from the axis of rotation of the respective rotor element are determined as a function of this detected eccentricity of the entire respective cylindrical surface.

2. The method according to claim 1, wherein, by the measuring device, a radial runout of at least two bearing sites of the respective rotor elements that are spaced axially apart from each other is detected, and wherein, by the analysis unit, the axis of rotation of the respective rotor elements is determined as a function of these detected radial runouts of the bearing sites that are spaced axially apart from each other.

3. The method according to claim 1, wherein, by at least one optical sensor element, an eccentricity of an entire bearing cylindrical surface of the respective rotor elements is captured, and wherein, by the analysis unit, the axis of rotation of the respective rotor elements is determined as a function of this captured eccentricity of the entire bearing cylindrical surface.

4. The method according to claim 1, wherein correction factors are predetermined for the respective rotor elements, and wherein, depending on these correction factors, the respective distance of a total center of mass of the rotor assembled from the rotor elements with respect to its total axis of rotation is determined for various relative mounting alignments of the rotor elements with respect to one another, by the analysis device.

5. The method according to claim 4, wherein, for the respective rotor elements, one of the respective correction factors is pre-specified in such a way that this correction factor corresponds in each case to a mass or weight of the respective rotor element.

6. The method according to claim 1, wherein the data recorded by the measuring device is linked by the analysis device to a three-dimensional model, in particular a CAD model, of the respective rotor elements.

7. The method according to claim 6, wherein the three-dimensional model of the respective rotor elements includes information on the respective densities thereof, in particular a density distribution, wherein, as a function of this information, the relative mounting alignments of the respective rotor elements with respect to one another, for which the distance of the total center of mass of the rotor to be manufactured is minimized relative to its total axis of rotation.

8. The method according to claim 1, wherein, depending on the data detected by the measuring device, at least one of the respective rotor elements is post-processed.

9. The method according to claim 1, wherein, by way of the measuring device, the data of a large number of functionally similar rotor elements are detected and, by the analysis device, the rotor element of this plurality of functionally similar rotor elements which is chosen for joining to at least one further rotor element is that rotor element whose choice minimizes the distance of the total center of mass of the rotor to be manufactured from its total axis of rotation.

10. The method according to claim 1, wherein the various relative mounting alignments of the rotor elements with respect to one another, for which the respective distances of the total center of mass of the rotor assembled from the rotor elements with respect to its total axis of rotation are determined, are chosen for discrete torsional angles of the rotor elements.

11. The method according to claim 1, wherein the distance of the center of mass of the respective rotor elements relative to the respective axis of rotation thereof and/or the distance of the total center of mass of the rotor with respect to a total axis of rotation of the rotor to be manufactured is/are compared by the analysis device with a pre-specified threshold value that corresponds to a respective tolerance specification for the respective rotor element and/or for the rotor.

12. The method according to claim 1, wherein the method is a method for joining at least two rotor elements of at least one rotor of a turbomachine designed as an aircraft engine.

13. The method according to claim 1, further comprising the step of:
providing a measuring apparatus for use in a method for joining at least two rotor elements of at least one rotor of a turbomachine; the measuring apparatus including a measuring device that comprises at least one optical sensor element, by which a radial runout of radially outer-lying cylindrical surfaces of the respective rotor elements can be captured.

14. The method according to claim 13, wherein the mounting apparatus comprises at least one alignment device, by which the rotor elements can be aligned automatically with respect to one another in such a way that, when the rotor elements are joined to one another, the distance of the total center of mass of the rotor to be manufactured is minimized relative to its total axis of rotation.

* * * * *